US009149855B2

(12) United States Patent
Bosco et al.

(10) Patent No.: US 9,149,855 B2
(45) Date of Patent: Oct. 6, 2015

(54) EQUIPMENT FOR FORMING A FRONTAL TOOTHING, IN PARTICULAR ON AN INNER RING OF A WHEEL HUB

(75) Inventors: Domenico Bosco, Borgaro Torinese (IT); Davide Antonio Olivieri, Turin (IT); Marcello Rossi, Turin (IT); Cengiz Shevket, Tutzing (DE)

(73) Assignee: AKTIEBOLAGET SKF, Gothenburg (SE)

( * ) Notice: Subject to any disclaimer, the term of this patent is extended or adjusted under 35 U.S.C. 154(b) by 431 days.

(21) Appl. No.: 13/554,002

(22) Filed: Jul. 20, 2012

(65) Prior Publication Data
US 2013/0180310 A1    Jul. 18, 2013

(30) Foreign Application Priority Data

Jul. 29, 2011    (IT) .............................. TO2011A0703

(51) Int. Cl.
*B21D 37/04*    (2006.01)
*B21K 21/12*    (2006.01)
(Continued)

(52) U.S. Cl.
CPC ................ *B21D 37/04* (2013.01); *B21J 5/008* (2013.01); *B21J 5/12* (2013.01); *B21J 9/025* (2013.01);
(Continued)

(58) Field of Classification Search
CPC ...... B21D 22/00; B21D 37/00; B21D 47/005; B21D 47/04; B21D 53/16; B21D 53/26; B21D 37/02; B21D 37/04; B21D 37/06; B30B 1/00; B30B 3/00; B30B 5/00; B30B 7/00; B30B 9/00; B30B 12/00; B21J 5/008; B21J 5/12; B21J 7/14; B21J 9/025; B21J 13/02; B21J 13/03; B21K 1/30

USPC ............ 72/66, 67, 68, 77, 82, 87, 89, 90, 91, 72/92, 93, 98, 100, 101, 102, 106, 112, 72/118, 122, 380, 381, 383, 384, 385, 386, 72/389.1, 389.2, 389.3, 389.5, 389.9, 72/390.2, 390.3, 390.4, 390.5, 390.6, 72/391.4, 394, 398, 400, 404, 407, 411, 72/412, 413, 416, 429, 455, 456, 462, 463, 72/469, 472, 478, 479; 403/24, 364
See application file for complete search history.

(56) References Cited

U.S. PATENT DOCUMENTS 874,448 A  *  12/1907  Smith .......................... 29/893.35
2,378,742 A  *  6/1945  Wellman .......................... 72/381
(Continued)

FOREIGN PATENT DOCUMENTS

FR    2320798 A1    3/1977
FR    2320798 A1  *  3/1977    .................. B21J 5/12
(Continued)

*Primary Examiner* — Edward Tolan
(74) *Attorney, Agent, or Firm* — Bryan Peckjian; SKF USA Inc. Patent Dept.

(57) ABSTRACT

An apparatus including rigid plate having a first face and a second face, a plurality of through seats arranged as a circular crown about an axis of symmetry (A), perpendicular to each seat and shaped as a circular crown segment; a plurality of knives carried by the plate, each being axially slidingly guided into a seat, independently of the other knives; each knife has a head which protrudes from the seat from the side of the first face, a prismatic body having an axial length greater than the seat, and a wedge-shaped end, opposite to the head, which protrudes from the second face when the head substantially abuts against the first face; the wedge-shaped ends circumferentially having a first profile, complementary to that of the frontal toothing to be obtained, and the knives can be replaced totally or partially with others having a second profile different from the first profile.

9 Claims, 6 Drawing Sheets

(51) Int. Cl.
  *B21K 25/00* (2006.01)
  *B21J 5/12* (2006.01)
  *B21J 9/02* (2006.01)
  *B21J 13/02* (2006.01)
  *B21K 1/30* (2006.01)
  *B60B 27/00* (2006.01)
  *B21J 5/00* (2006.01)

(52) U.S. Cl.
  CPC . *B21J 13/02* (2013.01); *B21K 1/30* (2013.01); *B21K 21/12* (2013.01); *B21K 25/00* (2013.01); *B60B 27/0047* (2013.01)

(56) References Cited

U.S. PATENT DOCUMENTS

| | | | | |
|---|---|---|---|---|
| 3,726,121 | A | * | 4/1973 | Arnold et al. .................. 72/402 |
| 3,913,374 | A | * | 10/1975 | Esser et al. ..................... 72/404 |
| 4,893,960 | A | * | 1/1990 | Beier et al. ..................... 403/24 |
| 5,764,051 | A | * | 6/1998 | Tajima et al. ............ 324/207.22 |
| 5,956,991 | A | * | 9/1999 | Tseng ........................... 72/213 |

FOREIGN PATENT DOCUMENTS

| | | | |
|---|---|---|---|
| JP | 2000094082 | A | 4/2000 |
| JP | 2011031682 | A | 2/2011 |

* cited by examiner

EQUIPMENT FOR FORMING A FRONTAL TOOTHING, IN PARTICULAR ON AN INNER RING OF A WHEEL HUB

CROSS-REFERENCE TO RELATED APPLICATION

This United States Non-Provisional Utility application claims the benefit of copending Italian Provisional Patent Application Serial No. TO2011A000703, filed on 29 Jul. 2011, which is incorporated herein in its entirety.

FIELD OF THE INVENTION

The present invention relates to an apparatus for forming a frontal toothing, e.g. on an inner ring of a wheel hub, by means of plastic deformation and with high accuracy. In particular, the present invention is applied to a wheel hub, the inner ring of which comprises a spindle, provided with a first rolling race for a first crown of rolling bodies, and an insert ring, provided with a second rolling track for a second crown of rolling bodies, wherein the insert ring is axially blocked onto the spindle by means of an upset collar, defined by an end section of the spindle which was plastically deformed.

BACKGROUND OF THE INVENTION

In the wheel hubs of the aforesaid type, the mentioned frontal toothing has the purpose of coupling head-to-head the inner ring of the wheel hub and a corresponding frontal toothing of an outer ring of a constant velocity joint, to ensure the torque transmission from the constant velocity joint to the inner ring of the wheel hub, which carries a wheel of the vehicle by means of a flanged end thereof. A coupling of this type is described in U.S. Pat. No. 4,893,960, which also teaches how to make the frontal toothing on the inner ring of the wheel hub. In particular, the frontal toothing is obtained using the so-called "orbital forming" method simultaneously with the forming of the upset collar by means of a tool including a truncated-cone-shaped element which upsets the collar and a frontally toothed tubular element, axially slidingly mounted on the truncated-cone-shaped element, which impresses the toothing onto the collar still during the step of deforming. A radially outer element of the toothed tubular element, which may either belong to the same tool or be a second separate tool, controls the radially outward deformation of the collar.

Although the forming method and apparatus described in U.S. Pat. No. 4,893,960 is satisfactory, it is relatively complex to be implemented and especially does not provide toothings with features of absolute tooth profile constancy, which feature is absolutely necessary nowadays in view of the ever increasing transmitted torques.

It is thus the object of the present invention to provide an apparatus for forming a frontal toothing on an inner ring of a wheel hub by means of plastic deformation, which is an alternative to the apparatus of the prior art, and in particular is capable of ensuring a higher dimensional accuracy of the teeth and maintaining a high dimensional and geometrical constancy in the profile of the teeth themselves.

BACKGROUND OF THE INVENTION

According to the present invention, apparatus for forming a frontal toothing on an inner ring of a wheel hub by means of plastic deformation is thus provided.

The fact that, according to the invention, the frontal toothing is impressed by means of a plurality of knives, independently carried by a single, substantially rigid plate, and which are impressed onto the already upset collar in sequence, by moving them independently from one another by pressing respective heads of the knives by means of an orbital forming tool, surprisingly allows to obtain frontal toothings by means of plastic deformation, in which the tooth profile is kept substantially constant, while ensuring a higher dimensional accuracy of the teeth thus obtained. Therefore, better, more accurate couplings are obtained between the inner ring of the wheel hub and the constant velocity joint, which allow more effective, quieter and higher capacity torque transmissions to be obtained.

Furthermore, the required frontal toothing is obtained with low energy consumption.

BRIEF DESCRIPTION OF THE DRAWINGS

Further features and advantages of the present invention will become apparent from the following description of a non-limitative embodiment thereof, made with reference to the accompanying drawings, in which.

DETAILED DESCRIPTION OF THE INVENTION

Figure 1:
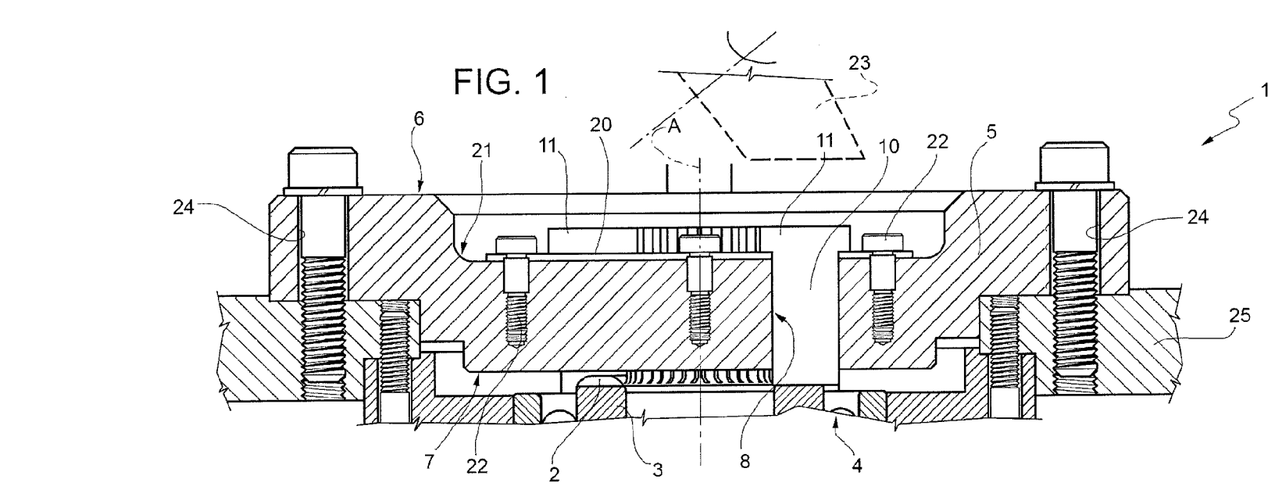
FIG. 1 shows in radial section an elevation view of the apparatus for forming a frontal toothing by means of plastic deformation, made according to the invention.
Figure 2:
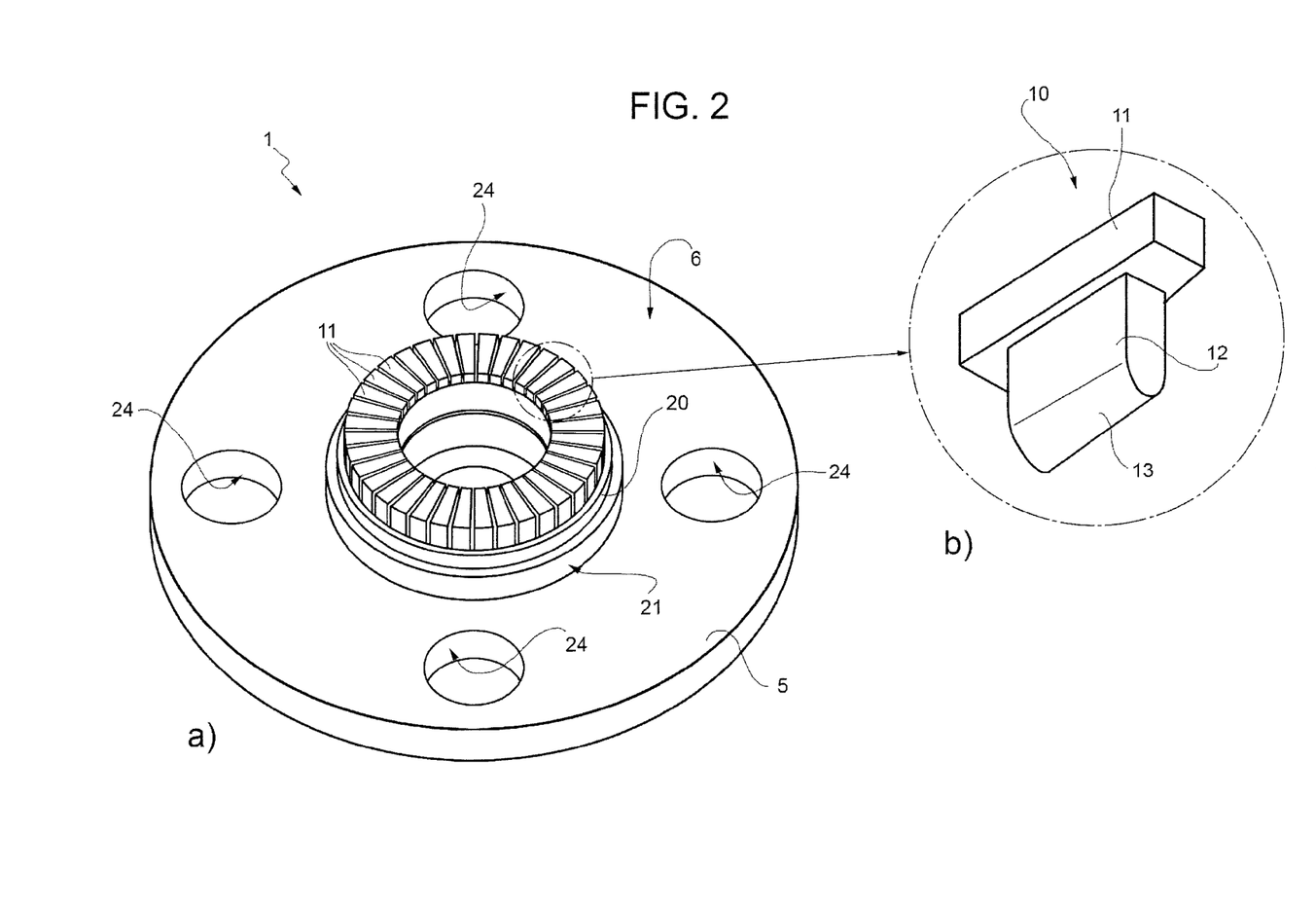
FIG. 2 diagrammatically shows on enlarged scale a perspective view of the main components of the apparatus in FIG. 1.
Figure 3:
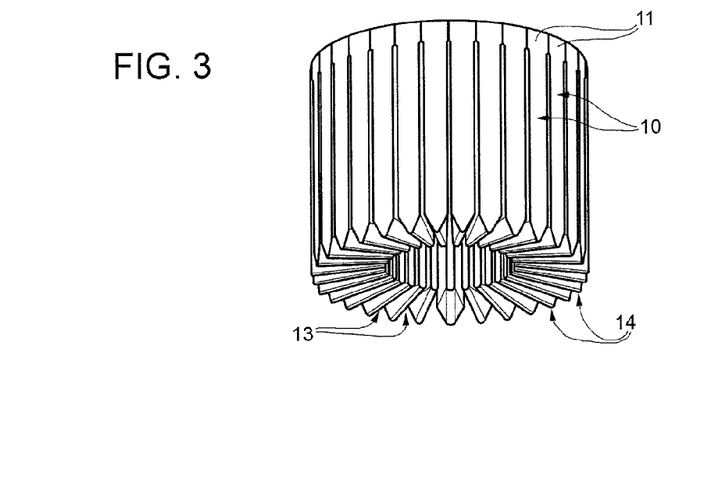
FIG. 3 shows perspective, three-quarters front and bottom views of a pack of knives belonging to the apparatus according to the invention arranged in the working position.

With reference to figures from 1 to 5, numeral 1 indicates an apparatus of known type for forming a frontal toothing 2 (FIG. 1), by means of plastic deformation, on an inner ring 3 of a wheel hub 4, also of known type, only partially and diagrammatically shown, for simplicity, in FIG. 1.

Figure 4:
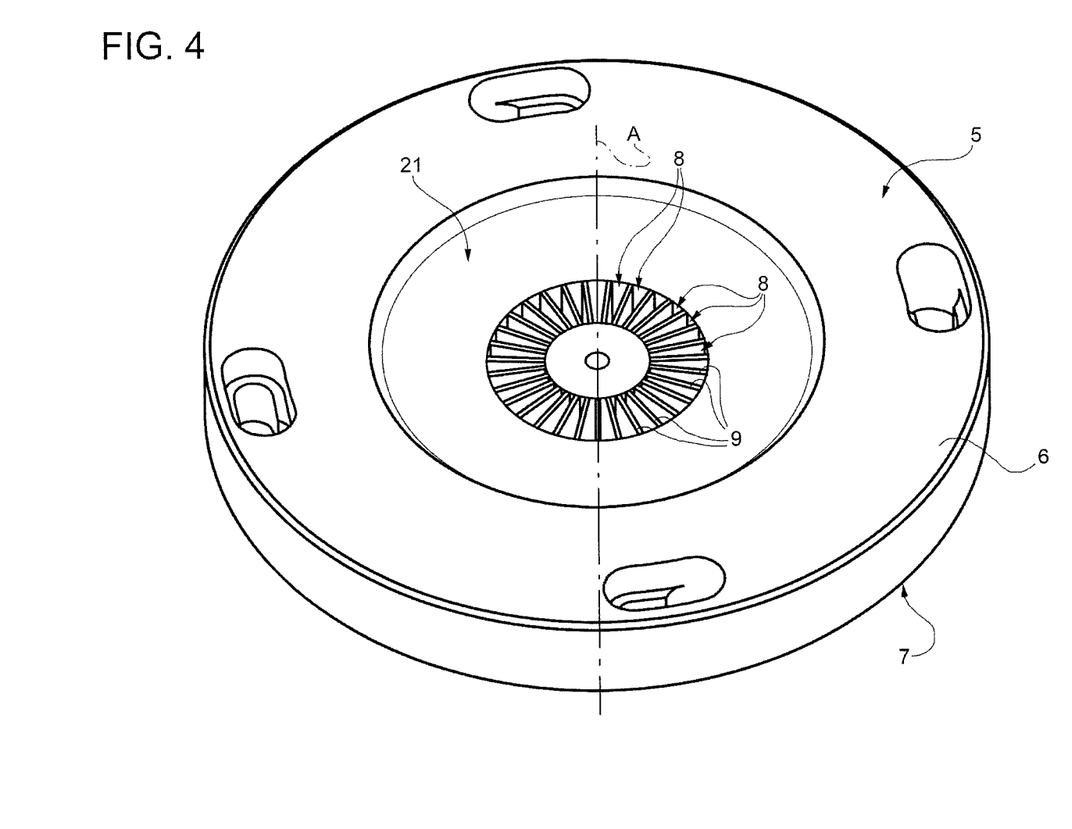
FIG. 4 shows a perspective, three-quarters top view of one of the components shown in FIG. 2.
Figure 5:
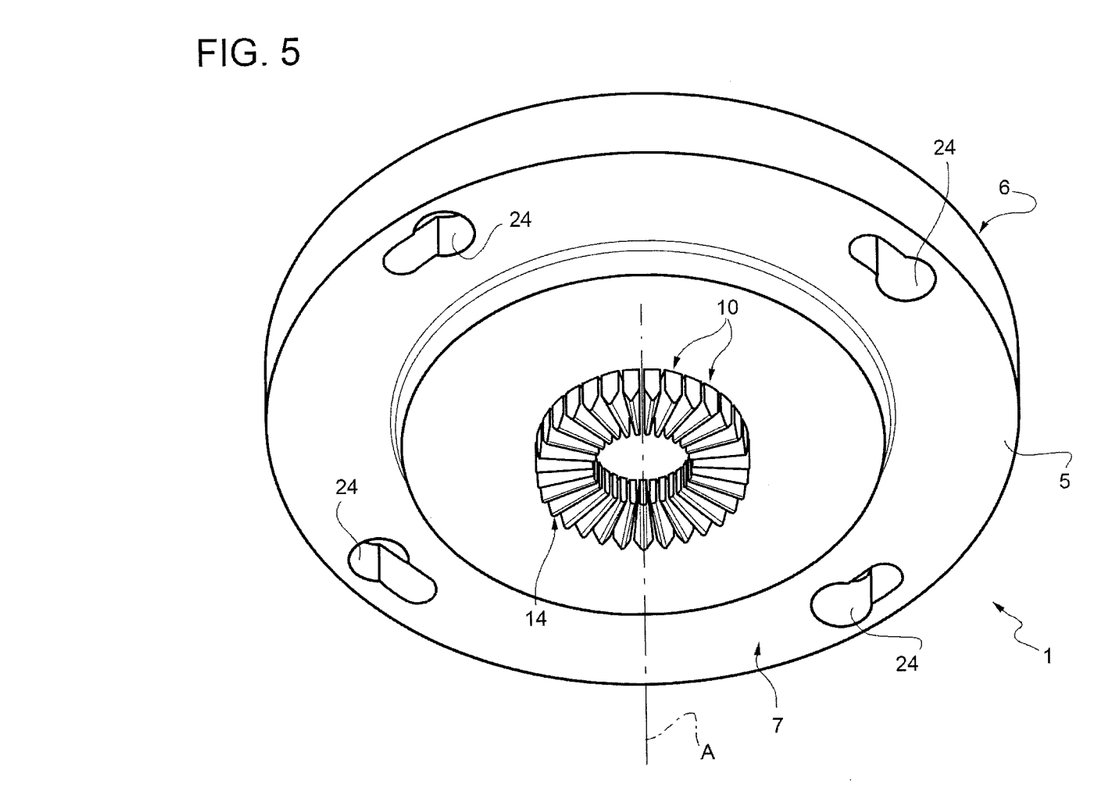
FIG. 5 shows perspective, three-quarters front and bottom views of the component in FIG. 4 provided with the pack of knives in FIG. 3.

Apparatus 1 comprises a substantially rigid plate 5 made of metal, e.g. cast iron or steel, in the form of a circular disc in this case, delimited by a first face 6 and a second face 7, which are substantially flat and opposite to each other, between which there are obtained through the plate 5 and in an axial direction, i.e. parallel to an axis of symmetry of plate 5, a plurality of through seats 8 (FIG. 4) arranged as a circular crown about the axis of symmetry A, perpendicular to which (i.e. on a plane perpendicular to axis A) each seat 8 has a transversal section shaped as a circular crown segment, as clearly shown in FIG. 4.

The seats 8 are circumferentially separated from one another by radially oriented, relatively thin lateral walls 9, having as a whole (i.e. considering the sum of the thicknesses of the opposite walls 9 which delimit each seat 8) a thickness measured in the circumferential direction which is smaller than the width, measured again in the circumferential direction, of the considered seat 8.

Apparatus 1 further comprises, in accordance with the invention, a plurality of knives 10 carried by plate 5, each knife 10 being axially slidingly guided (thus being movable parallel to axis A) into a seat 8, which is a fundamental feature according to the invention, independently of the other knives 10.

Figure 6:
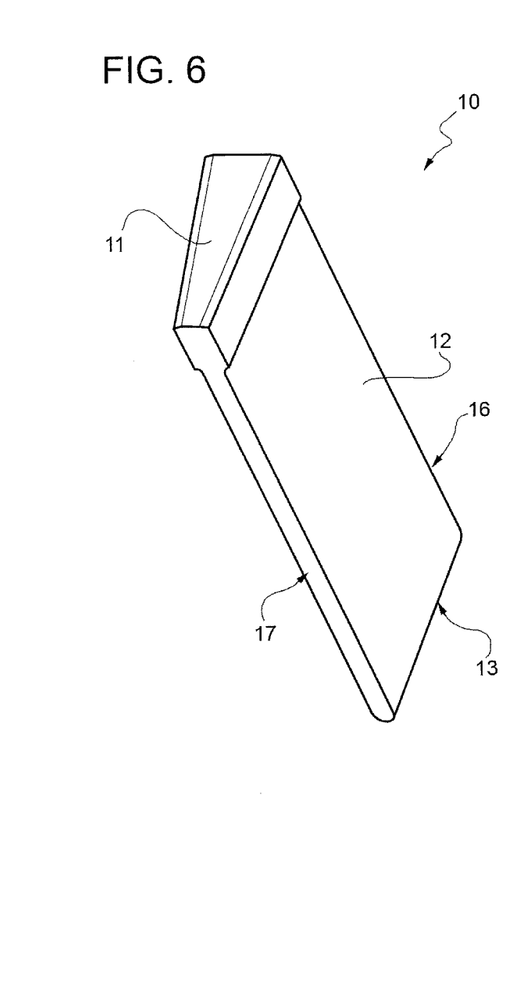
FIGS. 6 and 7 show two perspective opposite views of one of the knives in FIG. 3.
Figure 7:
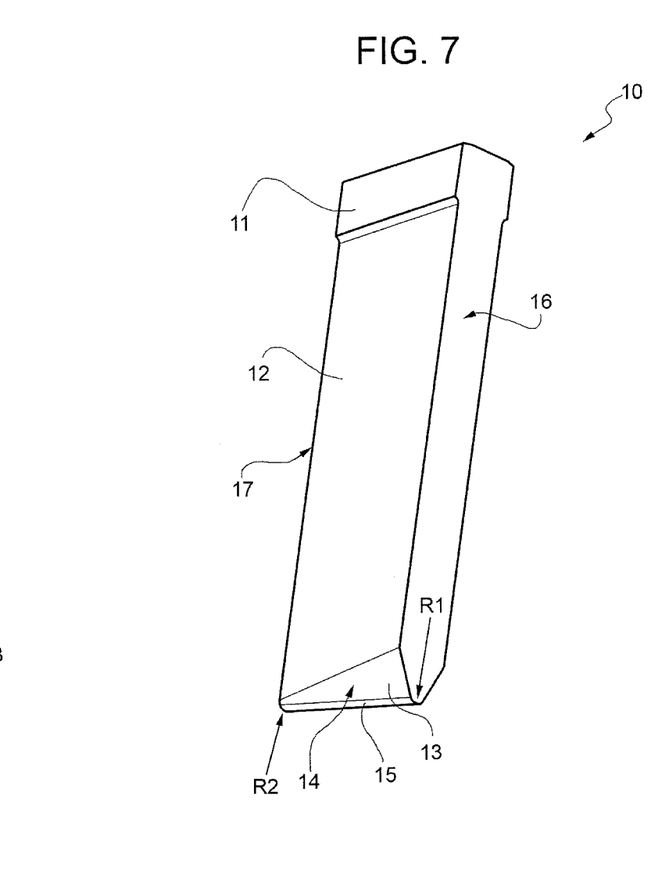

Each knife 10 (diagrammatic FIG. 2b, and FIGS. 6 and 7) comprises a head 11, which protrudes from seat 8 from the side of the first face 6, which is in use the upper face of the plate 5. Each knife 10 further comprises a prismatic body 12 having an axial length greater than that of the seat 8 engaged by the knife, and a wedge-shaped end 13, opposite to head 11, which protrudes from the second face 7 (which is in use the lower face of plate 5) when the head 11 substantially abuts against the first face 6, as clearly shown in FIGS. 2a and 5.

Face 7 is adapted to rest in use substantially abutting against the inner ring 3 of the wheel hub 4 on which toothing 2 is to be formed; the wedge-shaped ends 13 of knives 10 are circumferentially adjacent and circumferentially have a first profile 14, complementary to that of the frontal toothing 2 to be obtained, so that when each knife 10 is pushed against the inner ring 3, it is adapted to form the profile of the side of two adjacent teeth of the frontal toothing 2 to be obtained on the inner ring 3.

In particular, the wedge-shaped end 13 of each knife 10 is made so as to negatively mimic the profile of a respective tooth of the frontal toothing 2 to be obtained and is delimited on the side opposite to the first face 6 by an edge 15 radially orientated with respect to the axis of symmetry A, which edge 15 is rounded with a predetermined curvature radius R.

According to a preferred embodiment of the invention, the curvature radius R of edge 15 progressively varies in the radial direction, in particular gradually reducing as the axis of symmetry A is approached, e.g. (FIG. 7) it linearly varies with the distance from axis A, between a radius R1 which is larger, at a radially outer edge 16 of knife 10, and a radius R2 which is smaller, at a radially inner edge 17 of knife 10. However, in a different embodiment not shown for simplicity, such a radius R may remain constant.

Furthermore, according to a non-secondary aspect of the invention, the knives 10 are mounted to the plate in an interchangeable manner, so as to be rapidly replaced, entirely or in part, with other knives 10 having wedge-shaped ends 13 having at least a second profile 18 (and possibly a third profile 19, and so on), other than the first profile 14, so that the same apparatus 1 is adapted to form a plurality of frontal toothings 2 different from one another, by simply replacing one or more knives 10 in the seats 8.

In order to facilitate and make such a replacement more rapid, in the case of totally replacing knives 10, apparatus 1 further comprises a ring 20, which thoroughly supports all the knifes 10 already arranged in a position such as to enter into the respective seats 8, and which is integrally fixed in use to plate 5, against the first face 6 of plate 5, preferably within a shallow recess 21 obtained about the seats 8, on the first face 6, e.g. by means of screws 22.

The heads 11 of knives 10 are prismatic and trapezoidal-hammer shaped, and are adapted to cooperate in use head-to-head with an orbital forming tool 23 (known and only diagrammatically shown with a dashed line in FIG. 1) to be pushed, in use, against the first face 6 thus pushing the wedge-shaped end 13 of each knife 10 out of the seat 8 in order to protrude with respect to the second face 7 (FIG. 1) and, in use, cooperate with the inner ring 3 of the wheel hub 4.

In particular, the heads 11 are shaped so as to selectively cooperate with the orbital forming tool 23, either one at a time or in groups of heads 11 immediately adjacent to one another in the circumferential direction, so that the knives 10 are operated in sequence and not simultaneously.

Figure 7A:
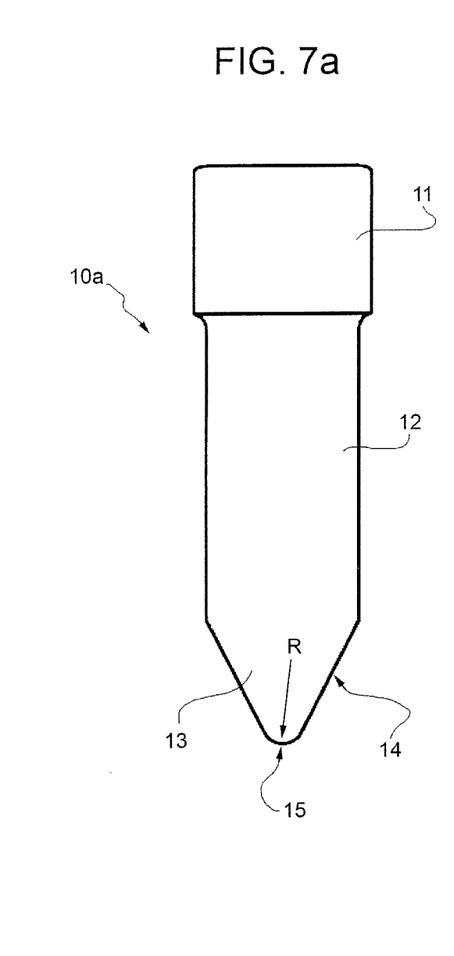
FIGS. 7a, 7b, 7c show possible different embodiments of the knife in FIGS. 6 and 7.
Figures 7B, 7C:
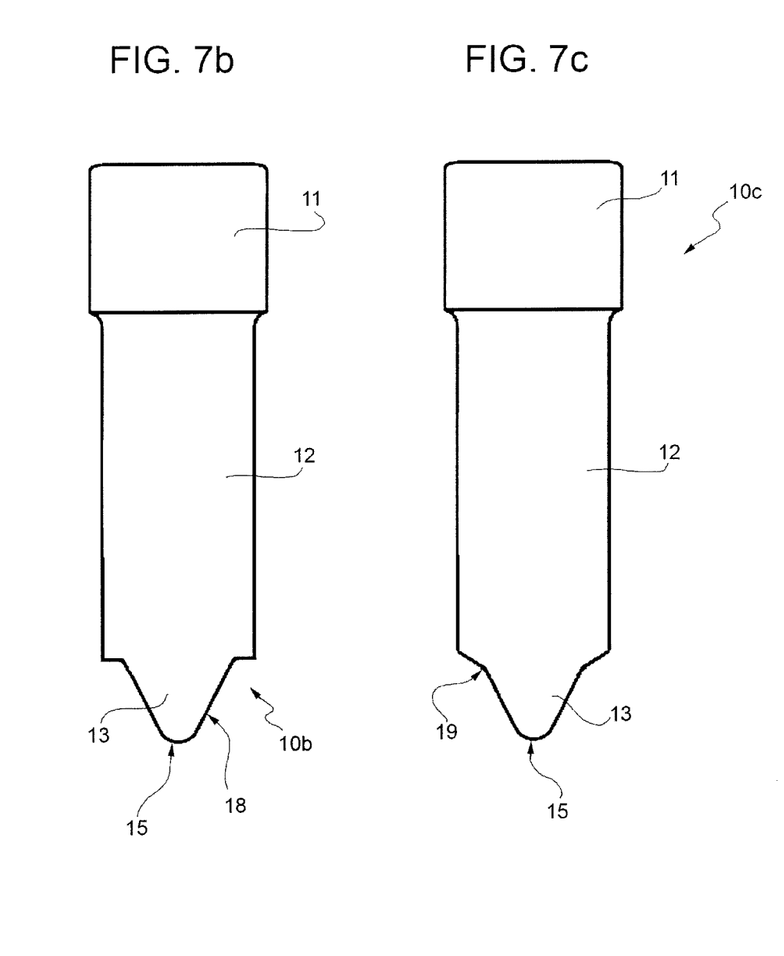

According to the invention, the knives 10 carried by plate 5 may be identical and have the same profile 14, or plate 5 may carry a plurality of knives, e.g. 10a (FIG. 7a) having the wedge-shaped end 13 provided with the first profile 14, in the through seats 8 and at least one knife 10b or 10c having a profile 18 or 19 different from profile 14 and arranged in a predetermined angular position. Thereby, the apparatus 1 according to the invention is adapted to make a frontal toothing 2 having a preferential meshing position without making any major changes thereto.

Plate 5 is finally provided with holding means 24, e.g. consisting of slotted holes, to a known orbital forming apparatus 25, to which tool 23 also belongs, normally used for making an upset edge (known and not shown for simplicity) of the inner ring 3 of the wheel hub 4; for such a purpose, plate 5 is shaped so as to be received by the orbital forming apparatus 25 with the second face 7 substantially resting against the inner ring 3 and with the first face 6 facing the orbital forming tool 23.

What I/we claim is:

1. An apparatus for forming, by means of plastic deformation, a frontal toothing on an inner ring of a wheel hub, the apparatus comprising:
    a substantially rigid plate delimited by first and second faces, opposite to each other,
    a plurality of through seats disposed in an axial direction being disposed between the faces of the plate and arranged as a circular crown about an axis of symmetry (A), perpendicular to which each seat has a transversal circular section shaped as a circular crown segment; and
    a plurality of knives carried by the plate, each axially slidingly guided into a respective seat of the plurality of through seats, wherein the sliding of each knife is independent of the sliding of the other knives; and wherein
    each knife comprises a head which protrudes from the seat from the side of the first face, a prismatic body having an axial length greater than that of the seat, and a wedge-shaped end, opposite to the head, which protrudes from the second face when the head substantially abuts against the first face; and wherein
    the wedge shaped ends are arranged in the circular crown pattern about the axis of symmetry (A), each longitudinal direction of the wedge shaped ends extending radially from the axis of symmetry (A), and wherein
    the second face being adapted to rest in use substantially abutting against the inner ring of the wheel hub; and wherein
    the wedge-shaped ends of the knives are circumferentially adjacent and circumferentially have a first profile, complementary to that of the frontal toothing to be formed, so that when each knife is pressed against the inner ring, the knife is adapted to form the profile of the side of two adjacent teeth of the frontal toothing to be obtained on the inner ring.

2. The apparatus according to claim 1, wherein the knives are interchangeable, as a whole or in part, with knives having wedge-shaped ends with a second profile, so that the apparatus may be adapted to form a plurality of different frontal toothing arrangements different from the first.

3. The apparatus according to claim 1, further comprising a ring that fully supports all of the knifes already arranged in a position to enter the respective seats, integrally fixed to the plate, against the first face of the plate, and within a shallow recess disposed about the seats on the first face.

4. The apparatus according to claim 1, wherein the heads of the knives are hammer shaped and adapted to cooperate head-to-head with an orbital forming tool to be pushed, towards the first face, pushing the wedge-shaped end of each knife out of the seat to protrude with respect to the second face and, cooperate with the inner ring of the wheel hub.

5. The apparatus according to claim 4, wherein the heads are shaped so as to selectively cooperate with the orbital forming tool, either one at a time or in groups of heads immediately adjacent to one another in the circumferential direction.

6. The apparatus according to claim 1, wherein the plate carries a plurality of knives with a wedge-shaped end having a first profile, and at least one knife with the wedge-shaped end having a second profile different from the first, and wherein
   the at least one knife being arranged in a predetermined angular position.

7. The apparatus according to claim 1, wherein the wedge-shaped end of each knife is designed to negatively mimic the profile of a respective tooth of the frontal toothing to be obtained and is delimited on the side opposite to the first face by an edge radially orientated with respect to the axis of symmetry (A), and wherein
   the edge is rounded with a predetermined curvature radius (R).

8. The apparatus according to claim 7, wherein the curvature radius (R) of the edge of the wedge-shaped end of each knife progressively varies in the radial direction, gradually reducing as the axis of symmetry (A) is approached.

9. The apparatus according to claim 1, wherein the plate is provided with holding means to an orbital forming apparatus for making an upset collar in the inner ring of the wheel hub; and wherein
   the plate being shaped so as to be received by the orbital forming apparatus with the second face substantially resting against the inner ring and with the first face facing towards the orbital forming tool.

* * * * *